(12) United States Patent
Li

(10) Patent No.: US 8,353,520 B2
(45) Date of Patent: Jan. 15, 2013

(54) INFANT CARRIER APPARATUS WITH A JOINT STRUCTURE HAVING AN ANTI-PINCH SAFETY FEATURE

(75) Inventor: Fang Ming Li, Central Hong Kong (HK)

(73) Assignee: Wonderland Nurserygoods Company Limited (TW)

( * ) Notice: Subject to any disclaimer, the term of this patent is extended or adjusted under 35 U.S.C. 154(b) by 75 days.

(21) Appl. No.: 12/951,162

(22) Filed: Nov. 22, 2010

(65) Prior Publication Data

US 2011/0133418 A1  Jun. 9, 2011

(30) Foreign Application Priority Data

Dec. 4, 2009 (CN) .......................... 2009 1 0253651

(51) Int. Cl.
*B62B 9/20* (2006.01)
(52) U.S. Cl. .................... 280/47.38; 403/12; 403/13
(58) Field of Classification Search ............. 280/33.993, 280/47.38, 639, 642, 643–644, 647–650, 280/658
See application file for complete search history.

(56) References Cited

U.S. PATENT DOCUMENTS

2010/0127480 A1* 5/2010 Ahnert et al. ................ 280/647

FOREIGN PATENT DOCUMENTS

| CN | 201102563 Y | 8/2008 |
|---|---|---|
| GB | 2380456 B | 5/2005 |
| GB | 2408240 B | 5/2007 |
| JP | 2009083844 B | 9/2007 |

\* cited by examiner

*Primary Examiner* — John Walters
*Assistant Examiner* — James Triggs
(74) *Attorney, Agent, or Firm* — Baker & McKenzie LLP

(57) ABSTRACT

A joint structure having an anti-pinch safety feature comprises a first support element and a second support element, and a joint structure including a coupling socket and an anti-pinch element. The coupling socket is respectively connected with the first and second support element. The anti-pinch element is interposed between the second support element and the coupling socket. The second support element when rotating about a pivot axis relative to the coupling socket forms a pinch region between an edge of the coupling socket and the second support element, and the anti-pinch element can continuously occlude the pinch region when the second support element is rotating. The joint structure can be suitable for use in a support frame of an infant carrier apparatus.

14 Claims, 5 Drawing Sheets

INFANT CARRIER APPARATUS WITH A JOINT STRUCTURE HAVING AN ANTI-PINCH SAFETY FEATURE

CROSS-REFERENCE TO RELATED APPLICATION

This application claims priority to China Patent Application No. 200910253651.0 filed on Dec. 4, 2009.

BACKGROUND

1. Field of the Invention

The present invention relates to an infant carrier apparatus, and more particularly to an infant carrier apparatus provided with a joint structure that has an anti-pinch safety feature.

2. Description of the Related Art

For convenient storage, most current strollers have a collapsible frame structure comprised of support elements that can be folded over one another. When the stroller is to be stored, the frame structure can be collapsed into a compact configuration that occupies a smaller volume. The ability to fold and unfold the frame structure allows flexible configuration of the stroller, but may also present certain risks of injury in use. In particular, finger pinching accidents may occur when the frame structure is unfolded and fingers of a young child or adult are inadvertently put in proximity of the moving support elements of the frame structure, which may cause severe laceration injuries.

Therefore, there is a need for an improved infant carrier apparatus that is safer in use, and address at least the foregoing issues.

SUMMARY

The present application describes an infant carrier apparatus provided with a joint structure having an anti-pinch safety feature. According to one embodiment, the provided joint structure comprises a first support element and a second support element, and a joint structure including a coupling socket and an anti-pinch element. The coupling socket is respectively connected with the first and second support element. The anti-pinch element is interposed between the second support element and the coupling socket. The second support element when rotating about a pivot axis relative to the coupling socket forms a pinch region between an edge of the coupling socket and the second support element, and the anti-pinch element can continuously occlude the pinch region when the second support element is rotating.

According to one embodiment, an infant carrier apparatus is described. The infant carrier apparatus comprises a support frame including a front leg frame, a rear leg frame and a push handle, and a joint structure including a coupling socket and an anti-pinch element. The coupling socket is respectively connected with the front leg frame and the push handle. The anti-pinch element is placed between the push handle and the coupling socket, and the push handle is operable to rotate about a pivot axis relative to the coupling socket. The anti-pinch element is constantly visible from a pinch region defined between the push handle and the coupling socket when the push handle is driven in rotation.

At least one advantage of the structures described herein is the ability to provide a safety feature that can effectively prevent the occurrence of finger pinching when the infant carrier apparatus is operated. Accordingly, the safety of the infant carrier apparatus can be improved.

DETAILED DESCRIPTION OF THE EMBODIMENTS

Figure 1:
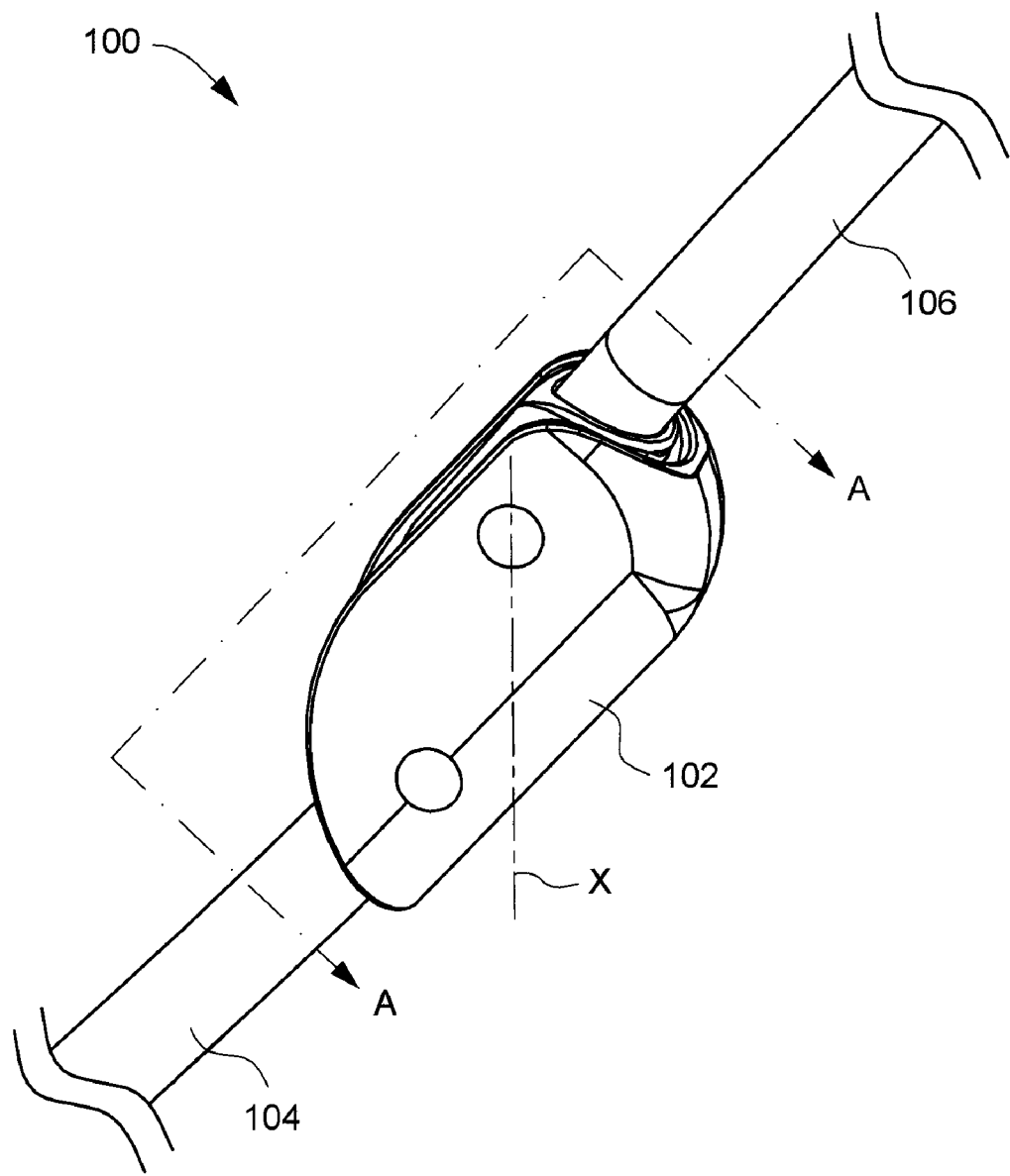
FIG. 1 is a perspective view illustrating an embodiment of a joint structure with an anti-pinch safety feature.
Figure 2:
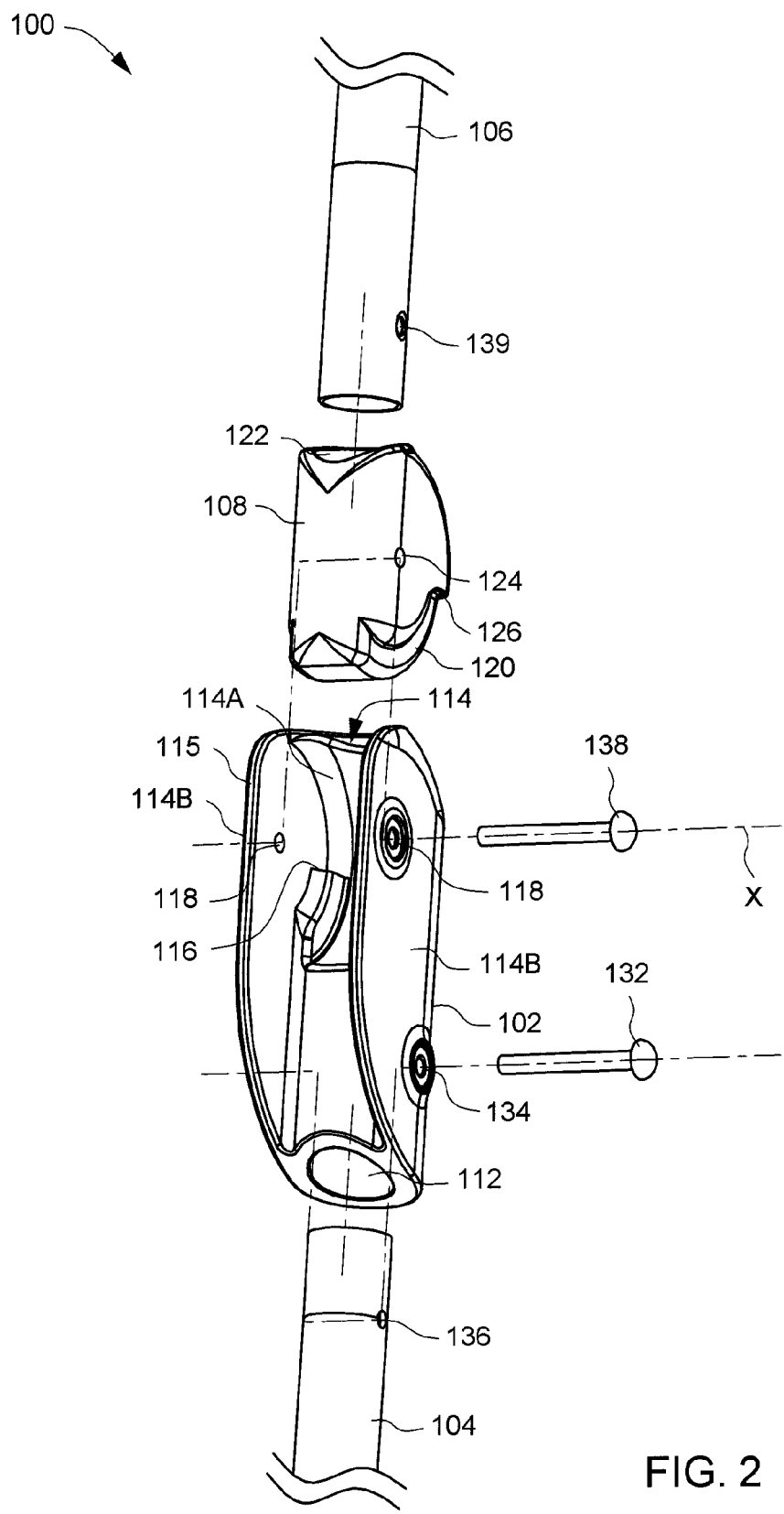
FIG. 2 is a cross-sectional view illustrating the joint structure of FIG. 1.

FIGS. 1 and 2 are respectively perspective and cross-sectional views illustrating an embodiment of a joint structure 100 with an anti-pinch safety feature. As shown, the joint structure 100 comprises a coupling socket 102, a first support element 104, a second support element 106 and an anti-pinch element 108. According to one embodiment, the first support element 104 and second support element 106 can be tubular parts, and the coupling socket 102 can be made of a rigid material including, without limitation, plastics materials. The coupling socket 102 can have an elongated shape with a hole 112 at one end portion, and a pocket 114 at another end portion opposite to the side of the hole 112. The pocket 114 can have a bottom surface 114A, and two opposite sidewalls 114B connected with the bottom surface 114A. In one embodiment, the bottom surface 114A can have a generally curved shape. Stop abutments 116 can also project from the bottom surface 114A respectively adjacent to the sidewalls 114B. The opposite sidewalls 114B also include symmetrical holes 118 for achieving a pivotal connection with the second support element 106.

The anti-pinch element 108 can be affixed with the second support element 106, and pivotally mounted in the pocket 114 of the coupling socket 102. As shown in FIG. 2, the anti-pinch element 108 can include a body 120 having a shape configured to generally fit with the shape of the pocket 114. The body 120 can have a first side surface provided with a hole 122, and two lateral second surfaces connected with the first surface that are provided with side holes 124 communicating with the hole 122. Moreover, the two second surfaces of the body 120 facing the sidewalls 114B can also respectively include lateral flanges 126. In one embodiment, the anti-pinch element 108, including the body 120 and lateral flanges 126, can be formed in a single piece. Any materials can be suitable for making the anti-pinch element 108, e.g., rigid plastics materials.

Referring again to FIGS. 1 and 2, when the joint structure 100 is assembled, the first support element 104 is inserted through the hole 112 of the coupling socket 102, and a rivet 132 can be respectively engaged through the holes 134 of the coupling socket 102 and the holes 136 of the first support element 104 for fixedly securing the first support element 104 with the coupling socket 102. The anti-pinch element 108 can be coupled with the second support element 106, and is assembled in the pocket 114 of the coupling socket 102. After an end portion of the second support element 106 is inserted through the hole 122, the anti-pinch element 108 with the end portion of the second support element 106 enclosed therein can be placed in alignment in the pocket 114. Then, a rivet 138 can be respectively engaged through the holes 118 of the coupling socket 102, the side holes 124 of the anti-pinch element 108 and the holes 139 on the second support element 106. The anti-pinch element 108 and the second support element 106 can be thereby secured with each other and pivotally assembled with the coupling socket 102, the anti-pinch element 108 being interposed between the coupling socket 102 and the second support element 106. The second support element 106 and the anti-pinch element 108 can rotate relative to a pivot axis X defined by the rivet 138.

Figure 3:
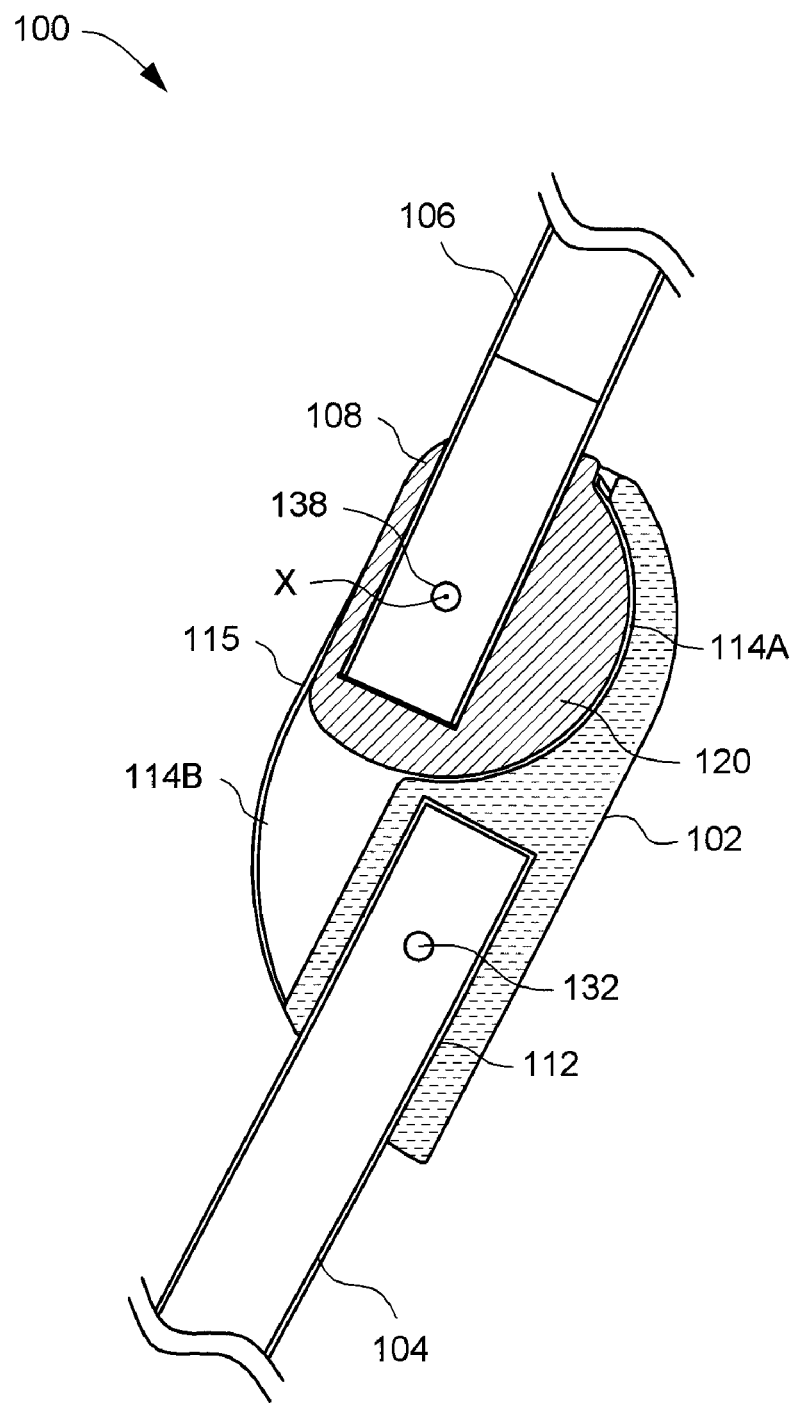
FIG. 3 is a cross-sectional view taken along section line A-A shown in FIG. 1 illustrating the joint structure in an unfolded state.
Figure 4:
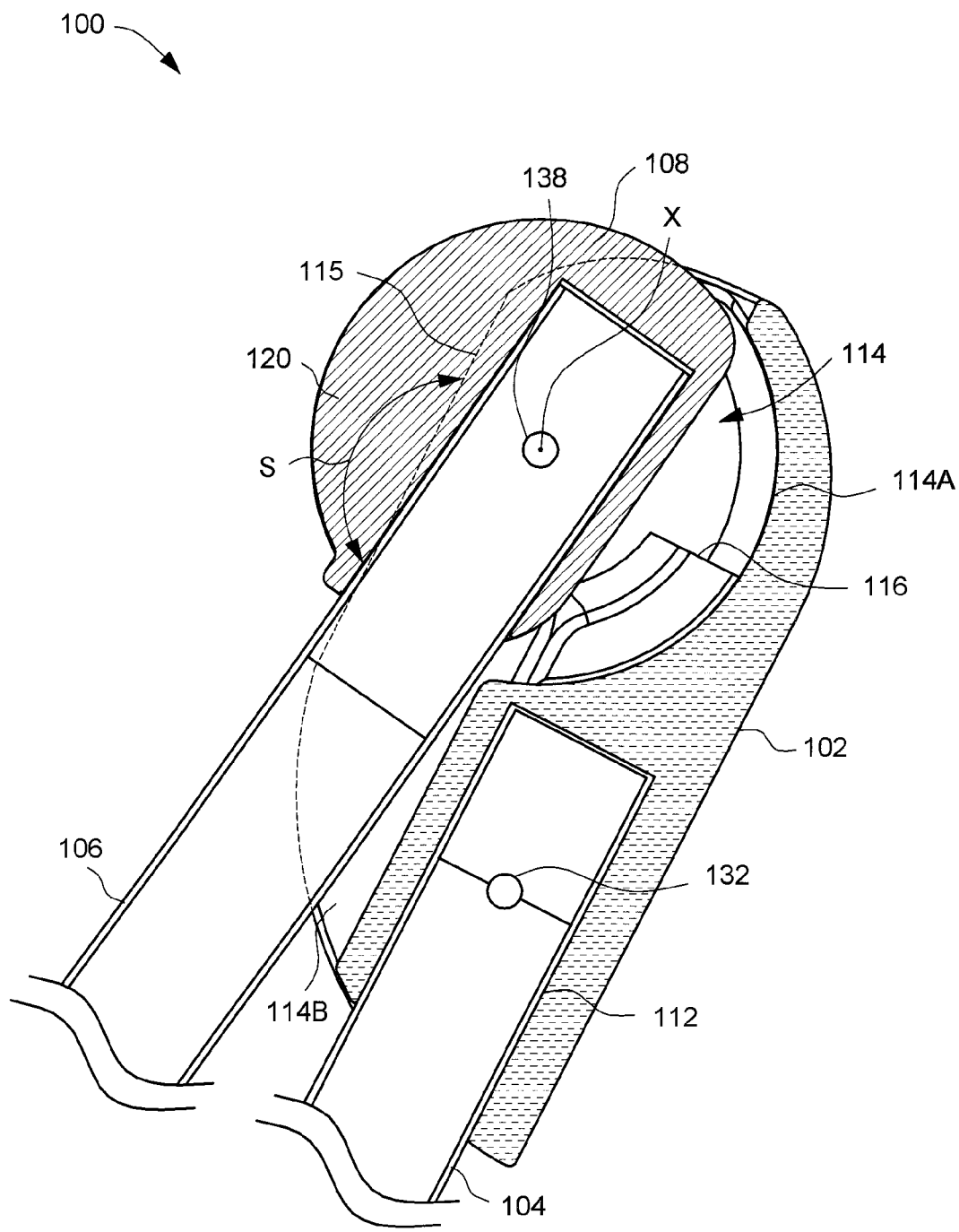
FIG. 4 is a cross-sectional view illustrating the joint structure in a folded state.

FIGS. 3 and 4 are schematic views illustrating an operation of the joint structure 100. More specifically, FIG. 3 is a cross-sectional view taken along section line A-A in FIG. 1 showing the joint structure 100 in a deployed or unfolded state, whereas FIG. 4 is a cross-sectional view showing the joint structure 100 in a collapsed or folded state. First referring to FIGS. 1, 2 and 3, when the joint structure 100 is in a first position corresponding to the unfolded state, the lateral flanges 126 of the anti-pinch element 108 can respectively lie in contact against the stop abutments 116, such that the first and second support elements 104 and 106 are unfolded to two opposite ends of the coupling socket 102. In this deployed state, the body 120 of the anti-pinch element 108 substantially fills the interior of the pocket 114, and substantially occludes and obstructs the opening of the pocket 114. Moreover, an end portion of the second support element 106 is located adjacent to an outer peripheral edge portion 115 of the sidewalls 114B, and extends out of the coupling socket 102.

When the second support element 106 is to be adjusted from the first position shown in FIG. 3 to a second position corresponding to the folded state shown in FIG. 4, the second support element 106 can be rotated about the pivot axis X of the rivet 138 toward a first side of the first support element 104. Accordingly, the anti-pinch element 108 can be moved to disengage from its contact with the stop abutments 116, and the second support element 106 can be folded adjacently over the first support element 104. In the folded state shown in FIG. 4, the body 120 of the anti-pinch element 108 is located substantially outside the pocket 114 and also substantially occludes the opening of the pocket 114. As a result, no pinching gap is formed between the coupling socket 102 and the second support element 106.

When the second support element 106 is to be unfolded from the second position shown in FIG. 4 to the first position shown in FIG. 3, the second support element 106 can be reversely rotated relative to the pivot axis X toward an opposite second side of the first support element 104. Accordingly, the second support element 106 rotates toward the outer peripheral edge portion 115 of the coupling socket 102, whereas the body 120 of the anti-pinch element 108 can move toward the interior of the pocket 114. During this unfolding movement, the body 120 of the anti-pinch element 108 substantially occludes in a continuous manner the opening of the pocket 114 as well as a pinch region S defined by the angular area between the second support element 106 and the outer peripheral edge portion 115 of the coupling socket 102 (as shown in FIG. 4). In other words, the anti-pinch element 108 can remain substantially visible from the pinch region S between the second support element 106 and the coupling socket 102. As a result, the anti-pinch element 108 can effectively occlude any pinch gap that may be formed between the second support element 106 and the coupling socket 102 (e.g., the pinch region S and the pocket 114) during the entire unfolding operation. The joint structure 100 can be therefore safer in use.

As the second support element 106 unfolds, the lateral flanges 126 of the anti-pinch element 108 can come into contact against the stop abutments 116 for stopping the second support element 106 in the deployed state shown in FIG. 3.

While the aforementioned anti-pinch safety feature is described in connection with the unfolded operation, the same design may also be applied for preventing finger pinching during folding operation of the joint structure 100.

Figure 5:
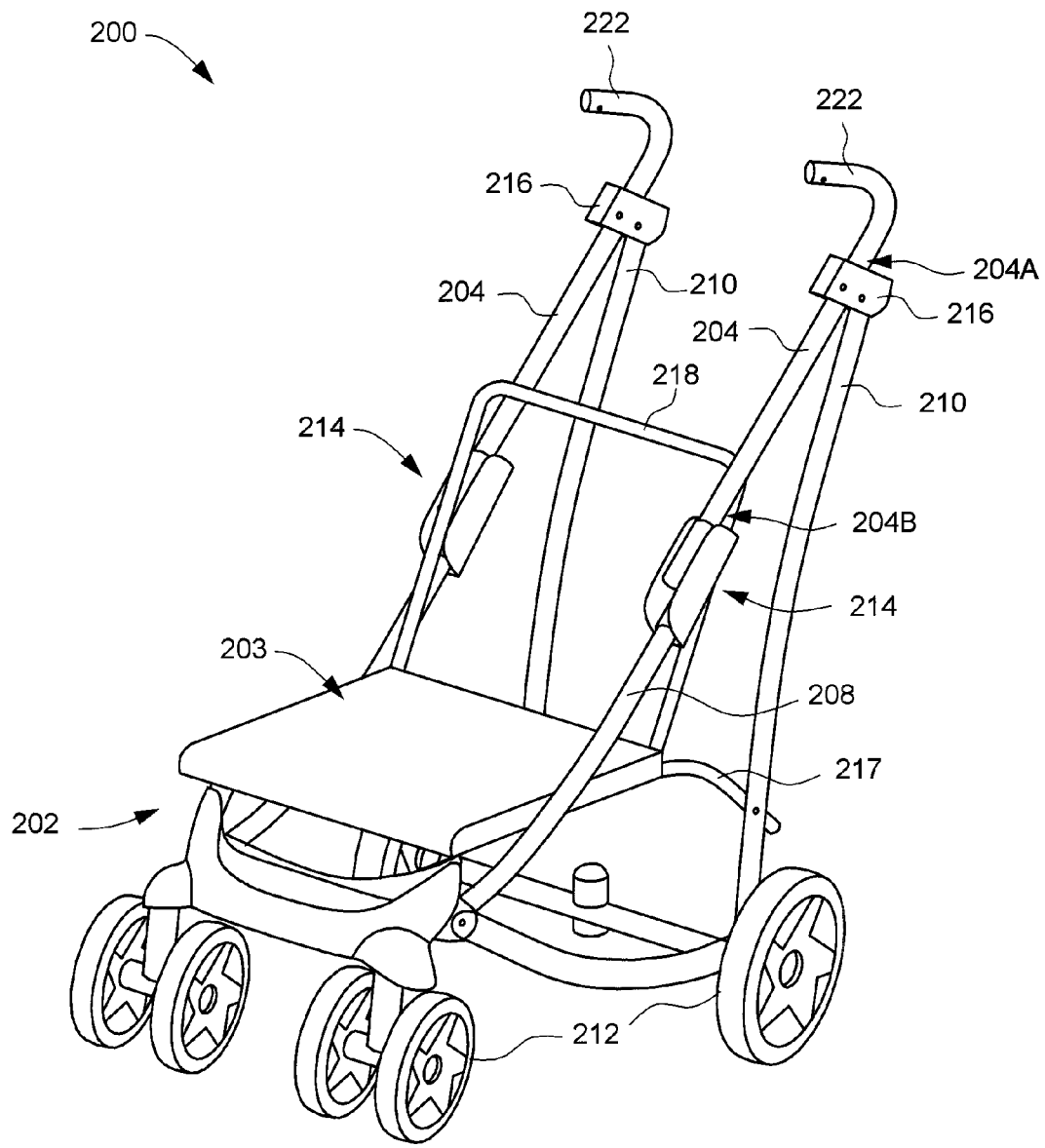
FIG. 5 is a schematic view illustrating one embodiment of an infant carrier apparatus provided with a joint structure having the anti-pinch safety feature.

FIG. 5 is a schematic view illustrating one embodiment of an infant carrier apparatus 200 provided with an anti-pinch joint structure as described previously. In the illustrated embodiment, the infant carrier apparatus 200 is exemplary a child stroller. However, the features described herein may be applicable to any infant carrier apparatus in general. The infant carrier apparatus 200 can comprise a support frame 202, a seat assembly 203 provided on the support frame 202, and a push handle 204. The support frame 202 can include a front leg frame 208, a rear leg frame 210, and a plurality of wheels 212 provided at bottom ends of the front and rear leg frame 208 and 210. Left and right side sections of the front leg frame 208 can be respectively connected with left and right side sections of the push handle 204 via a pivotal joint structure 214. According to one embodiment, each of the joint structure 214 can have a first end portion connected with the front leg frame 208, and a second end portion connected with the push handle 204 so as to permit the push handle 204 and front leg frame 208 to pivotally fold over each other. In turn, the rear leg frame 210 can be pivotally connected with the push handle 204 via a hinge 216. While the present embodiment connects the rear leg frame 210 with the push handle 204, alternate embodiments can couple the rear leg frame 210 with the front leg frame 208.

The seat assembly 203 can be placed between the front leg frame 208 and the rear leg frame 210. According to one embodiment, the seat assembly 203 can include a seat frame, and a seat cushion placed on the seat frame. The seat assembly 203 can have a front end coupled with the front leg frame 208, and a rear end connected with the rear leg frame 210 via a linkage 217. In addition, the seat assembly 203 can also include a backrest frame 218. The backrest frame 218 can be formed from a U-shaped tubular structure having left and right sections respectively connected with a mechanism (not shown) that can permit adjustment of the inclination of the backrest frame 218.

The push handle 204 can be formed from a single tube or the assembly of multiple tubular structures. The push handle 204 can include a transverse section 204A forming a bar 222 that can be grasped by a user, and two parallel side sections 204B upwardly joined with two opposite ends of the transverse section 204A and downwardly connected with the joint structures 214. An adult can use the bar 222 for pushing infant carrier apparatus 200 in movement. The side sections 204B are movably connected with the joint structures 214, such that the push handle 204 can fold over the front leg frame 208 when infant carrier apparatus 200 is turned to a collapsed state. According to one embodiment, the construction described previously with reference to FIGS. 1 through 4 can be used for making each of the joint structures 214. In other words, the front leg frame 208 can be the first support structure 104, the push handle 204 can be the second support structure 106, and the coupling socket 102 and anti-pinch element 108 can be assembled between the front leg frame 208 and the push handle 204. When the adult adjusts the push handle 204 from the folded or collapsed state to the unfolded or deployed state (as illustrated in FIGS. 3 and 4), this construction of the joint structure 214 can prevent the occurrence of accidental finger pinching. As a result, the infant carrier apparatus 200 can be safer in use.

At least one advantage of the structures described herein is the ability to provide a safety feature that can effectively prevent the occurrence of accidental finger pinching when the infant carrier apparatus is operated. Accordingly, the safety of the infant carrier apparatus can be improved.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. An infant carrier apparatus comprising:
a support frame, including a front leg frame, a rear leg frame and a push handle; and
a joint structure, including a coupling socket and an anti-pinch element, wherein the coupling socket includes a pocket having an outer peripheral edge portion and is respectively connected with the front leg frame and the push handle, the anti-pinch element is placed in the pocket between the push handle and the coupling socket, and the push handle is operable to rotate about a pivot axis relative to the coupling socket between a first position corresponding to an unfolded state and a second position corresponding to a folded state;
wherein the push handle when rotating from the second position to the first position moves toward the outer peripheral edge portion of the coupling socket through a pinch region that is defined between the push handle and the outer peripheral edge portion and extends to an end of the coupling socket, when the push handle is in the second position the anti-pinch element protrudes beyond an opening of the pocket substantially along a length of the pinch region, and the anti-pinch element is constantly visible from the pinch region and substantially continuously occludes the pinch region when the push handle is driven in rotation from the second position to the first position.

2. The apparatus according to claim 1, wherein the anti-pinch element is connected around an end portion of the push handle and is operable to rotate along with the push handle about the pivot axis.

3. The apparatus according to claim 1, wherein the anti-pinch element includes a body that substantially fills an interior of the pocket when the push handle is in the first position.

4. The apparatus according to claim 3, wherein the body is located substantially outside the pocket when the push handle is in the second position.

5. The apparatus according to claim 3, wherein the body of the anti-pinch element moves toward an interior of the pocket when the push handle rotates from the second position to the first position.

6. The apparatus according to claim 3, wherein an interior of the pocket includes a stop abutment, and when the push handle reaches the first position the anti-pinch element contacts with the stop abutment.

7. A joint structure with an anti-pinch safety feature, comprising:
a first support element and a second support element; and
a joint structure including a coupling socket and an anti-pinch element, wherein the coupling socket includes a pocket having an outer peripheral edge portion and is respectively connected with the first and second support element, the anti-pinch element is assembled in the pocket interposed between the second support element and the coupling socket, and the second support element is operable to rotate about a pivot axis relative to the coupling socket between a first position corresponding to an unfolded state and a second position corresponding to a folded state;
wherein the second support element when rotating from the second position to the first position moves toward the outer peripheral edge portion of the coupling socket through a pinch region that is defined between the second support element and the outer peripheral edge portion and extends to an end of the coupling socket, when the second support element is in the second position the anti-pinch element protrudes beyond an opening of the pocket substantially along a length of the pinch region, and the anti-pinch element substantially continuously occludes the pinch region when the second support element is rotating from the second position to the first position.

8. The joint structure according to claim 7, wherein the anti-pinch element encloses an end portion of the second support element and is operable to rotate along with the second support element about the pivot axis.

9. The joint structure according to claim 7, wherein the anti-pinch element includes a body that substantially fills an interior of the pocket when the second support element is in the first position.

10. The joint structure according to claim 9, wherein the body is located substantially outside the pocket when the second support element is in the second position.

11. The joint structure according to claim 9, wherein when the second support element rotates from the second position to the first position, the body of the anti-pinch element moves toward an interior of the pocket.

12. The joint structure according to claim 9, wherein an interior of the pocket includes a stop abutment, and when the second support element reaches the first position the anti-pinch element contacts with the stop abutment.

13. The apparatus according to claim 1, wherein the push handle and the front leg frame extend substantially parallel to each other when the push handle is in the first position.

14. The joint structure according to claim 7, wherein the first support element and the second support element extend substantially parallel to each other when the second support element is in the first position.

* * * * *